(12) United States Patent
Ogawa et al.

(10) Patent No.: US 11,848,163 B2
(45) Date of Patent: *Dec. 19, 2023

(54) ELECTRODE FOIL FOR ELECTROLYTIC CAPACITOR, ELECTROLYTIC CAPACITOR, AND METHOD FOR MANUFACTURING SAME

(71) Applicant: Panasonic Intellectual Property Management Co., Ltd., Osaka (JP)

(72) Inventors: Miwa Ogawa, Osaka (JP); Naomi Kurihara, Osaka (JP); Mitsuhisa Yoshimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 121 days.

This patent is subject to a terminal disclaimer.

(21) Appl. No.: 17/396,635

(22) Filed: Aug. 6, 2021

(65) Prior Publication Data

US 2021/0366660 A1    Nov. 25, 2021

Related U.S. Application Data

(63) Continuation of application No. PCT/JP2020/007017, filed on Feb. 21, 2020.

(30) Foreign Application Priority Data

Feb. 28, 2019   (JP) .................................. 2019-037031

(51) Int. Cl.
*H01G 9/045* (2006.01)
*H01G 9/00* (2006.01)
(Continued)

(52) U.S. Cl.
CPC .......... *H01G 9/045* (2013.01); *H01G 9/0032* (2013.01); *H01G 9/055* (2013.01); *H01G 9/07* (2013.01); *H01G 9/15* (2013.01)

(58) Field of Classification Search
CPC ....................................................... H01G 9/07
See application file for complete search history.

(56) References Cited

U.S. PATENT DOCUMENTS

2017/0076872 A1  3/2017 Arakawa et al.
2018/0158611 A1  6/2018 Arakawa et al.
(Continued)

FOREIGN PATENT DOCUMENTS

CN   108701548 A   10/2018
WO   2015/190278   12/2015
(Continued)

OTHER PUBLICATIONS

International Search Report of PCT application No. PCT/JP2020/007017 dated May 12, 2020.
(Continued)

*Primary Examiner* — Eric W Thomas
(74) *Attorney, Agent, or Firm* — Rimon PC

(57) ABSTRACT

An electrode foil for an electrolytic capacitor includes an anode body foil having a porous part, and a dielectric layer covering a surface of a metal framework constituting the porous part. The dielectric layer includes a first layer containing an oxide of a second metal, the second metal being different from a first metal contained in the metal framework. An underlayer that is continuous with the first layer is provided between the metal framework and the first layer. The underlayer contains phosphorus and carbon.

7 Claims, 4 Drawing Sheets

(51) Int. Cl.
*H01G 9/055* (2006.01)
*H01G 9/07* (2006.01)
*H01G 9/15* (2006.01)

(56) References Cited

U.S. PATENT DOCUMENTS

2018/0358181 A1   12/2018  Ogawa et al.
2021/0366661 A1*  11/2021  Yoshimura ............. H01G 9/055

FOREIGN PATENT DOCUMENTS

| WO | 2015/190278 A1 | 12/2015 |
| WO | 2017/026247 A1 | 2/2017 |
| WO | 2017/154461 A1 | 9/2017 |
| WO | 2018/198744 A1 | 11/2018 |

OTHER PUBLICATIONS

International Search Report of PCT application No. PCT/JP2020/007016 dated Apr. 28, 2020.
English Translation of Chinese Office Action dated Nov. 28, 2022 for the related Chinese Patent Application No. 202080017071.6.

* cited by examiner

ELECTRODE FOIL FOR ELECTROLYTIC CAPACITOR, ELECTROLYTIC CAPACITOR, AND METHOD FOR MANUFACTURING SAME

RELATED APPLICATIONS

This application is a continuation of the PCT International Application No, PCT/JP2020/007017 filed on Feb. 21, 2020, which claims the benefit of foreign priority of Japanese patent application No. 2019-037031 filed on Feb. 28, 2019, the contents all of which are incorporated herein by reference.

BACKGROUND

1. Technical Field

The present disclosure relates to an electrode foil for an electrolytic capacitor, an electrolytic capacitor, and production methods therefor.

2. Description of the Related Art

For example, a metal foil containing a valve metal is used as an anode body of an electrolytic capacitor. In order to increase the capacitance of the electrolytic capacitor, a main surface of the metal foil is etched to form a porous metal portion. Thereafter, a layer of a metal oxide (dielectric) is formed on a surface of the porous metal portion by performing a chemical conversion treatment on the metal foil.

On the other hand, International Publication No. WO 2015/190278 discloses that a dielectric layer is formed on a surface of a porous metal base material by a gas phase method.

SUMMARY

An electrode foil for an electrolytic capacitor according to a first aspect of the present disclosure includes an anode body having a porous part, and a dielectric layer covering a surface of a metal framework constituting the porous part. The dielectric layer includes a first layer containing an oxide of a second metal different from a first metal contained in the metal framework. An underlayer that is continuous with the first layer is provided between the metal framework and the first layer. The underlayer contains phosphorus and carbon.

An electrolytic capacitor according to a second aspect of the present disclosure includes the electrode foil for an electrolytic capacitor, and a cathode part covering at least a part of the dielectric layer.

A production method of an electrode foil for an electrolytic capacitor according to a third aspect of the present disclosure includes: preparing an anode body having a porous part, bringing an alkali solution into contact with the anode body, forming an underlayer on a surface of a metal framework consisting the porous part by heating the anode body to which the alkali solution adheres, and forming, on a surface of the underlayer, a dielectric layer including a first layer containing an oxide of a second metal by a gas phase method. The second metal is different from a first metal contained in the metal framework.

A production method for an electrolytic capacitor according to a fourth aspect of the present disclosure includes the production method of the electrode foil for an electrolytic capacitor, and forming a cathode part covering the dielectric layer.

According to the present disclosure, even when a kind of a metal element contained in the dielectric layer is different from a kind of metal contained in the anode body, it is possible to obtain an electrode foil for an electrolytic capacitor, an electrolytic capacitor, and a production method therefor which can sufficiently reduce a leakage current.

DETAILED DESCRIPTION OF EMBODIMENT

Figure 1:
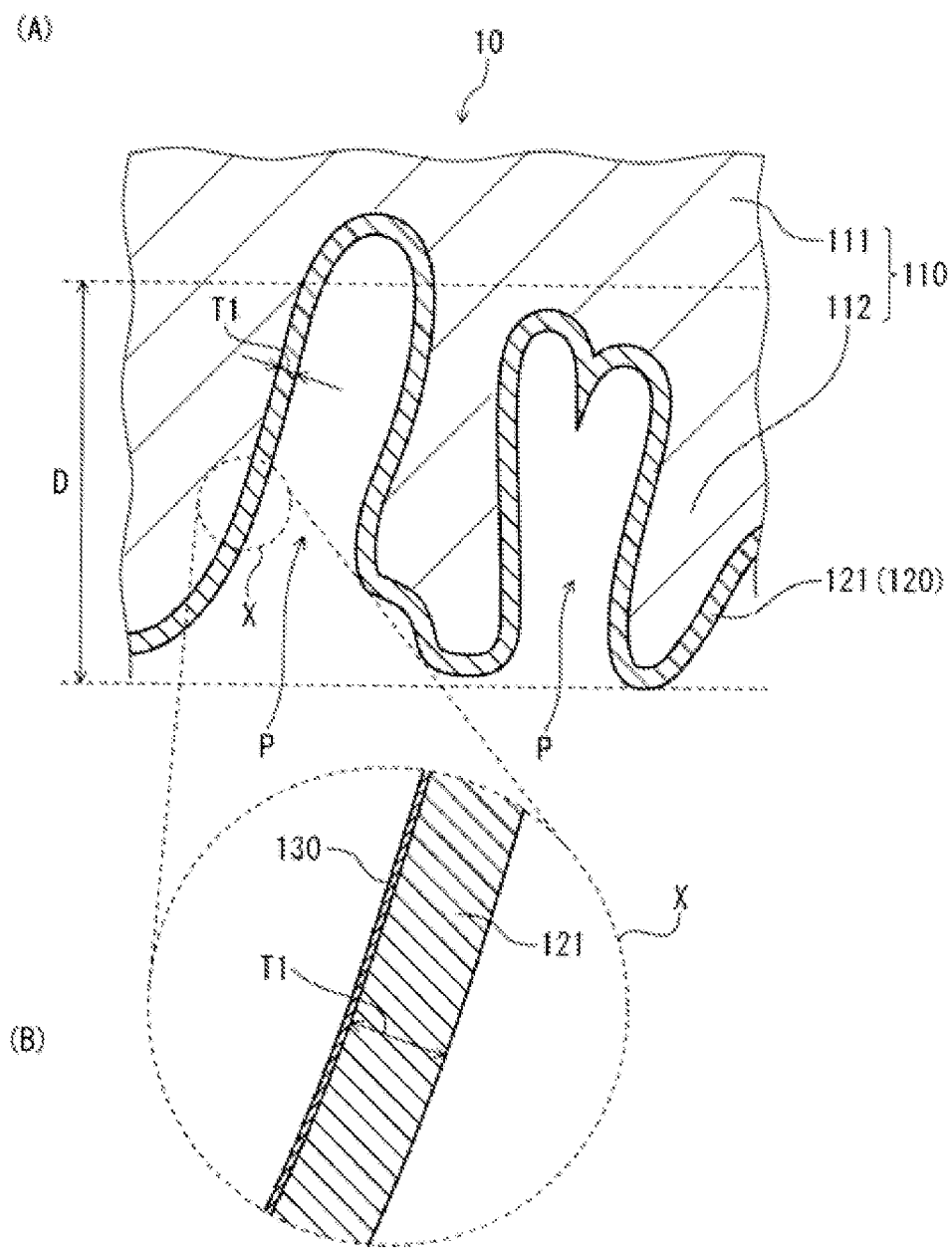
FIG. 1 is an enlarged schematic cross-sectional view illustrating an anode foil according to an exemplary embodiment of the present disclosure, (A) is an enlarged schematic cross-sectional view illustrating a part of a porous part including a dielectric layer, and (B) is an enlarged view of a portion surrounded by a broken line X.

When a kind of a metal element contained in a dielectric layer is different from a kind of metal contained in an anode body, a leakage current of an electrolytic capacitor is likely to increase.

An electrode foil for an electrolytic capacitor according to the present exemplary embodiment includes an anode body having a porous part, and a dielectric layer covering a surface of a metal framework constituting the porous part. An electrolytic capacitor according to the present exemplary embodiment includes the electrode foil and a cathode part covering the dielectric layer. Hereinafter, the anode body having the porous part may be referred to as a metal foil having the porous part.

The anode body is, for example, an integrated product of a core material part and the porous part. The anode body is obtained by, for example, etching a part of the metal foil made of a first metal. Thus, the metal framework contains the first metal. The porous part is an outer portion of the metal foil that has been made to be porous by etching, and the remaining portion (portion other than the porous part) which is an inner portion of the metal foil is the core material part.

The metal framework refers to a metal portion having a fine structure in the porous part. The porous part has pits or pores surrounded by the metal framework. The dielectric layer is provided so as to cover at least a part of the surface of the metal framework surrounding the pits or pores.

The dielectric layer includes a first layer containing an oxide of a second metal different from the first metal contained in the metal framework. When the oxide of the second metal different from the first metal is added in the dielectric layer, for example, the second metal having a high dielectric constant can be selected without being restricted by the first metal. Thus, the capacitance of the electrolytic capacitor is easily improved. Since a range of selection of the second metal is widened, various performances can be imparted to the dielectric layer without being restricted by the first metal.

An underlayer continuous with the first layer is provided between the metal framework and the first layer. The underlayer corresponds to a boundary region between the first layer and the metal framework or a boundary region between the first layer and another layer. A thickness of the underlayer may be thin and may not have a clear layer structure. The thickness of the underlayer may be less than or equal to, for example, 1 nm. Here, the underlayer contains, at minimum, phosphorus and carbon. Alternatively, the underlayer contains, at minimum, hydrogen and oxygen. From this configuration, for example, sufficient acid resistance can be imparted to the dielectric layer, and the leakage current can be sufficiently reduced.

When the first layer is formed on the surface of the metal framework as at least a part of the dielectric layer, a preferable growth of the first layer can be obtained by providing an underlayer containing a combination of phosphorus and carbon or a combination of hydrogen and oxygen. It is considered that this is because a surface state of the underlayer is stabilized.

Usually, a natural oxide film of the first metal is present on the surface of the metal framework. When the oxide of the second metal is formed on the surface of the natural oxide film of the first metal, it is difficult to form the preferable first layer. This is considered to be because physical properties of the natural oxide film containing the first metal are different from physical properties of the oxide of the second metal, or it is difficult to enhance continuity between the natural oxide film and the oxide of the second metal. In this case, a defect in the dielectric layer is likely to occur, and thus the leakage current is likely to increase. Even when the surface of the metal framework is modified, the modified surface is usually unstable, and thus it is difficult to uniformly grow the oxide of the second metal. In such a case, when a coordination number of oxygen in a stoichiometric composition of the oxide of the second metal is X1 and an actual coordination number of the oxygen in the oxide of the second metal is X2, a ratio of X2 to X1 (X2/X1) is usually less than 0.9, and may be less than or equal to, for example, 0.8 or less than or equal to 0.7.

In contrast to this, phosphorus stabilizes the modified surface of the metal framework. Meanwhile, the amount of phosphorus contained in the underlayer may be a small amount. Unlike a case where a large amount of phosphorus is contained in the underlayer, carbon is also detected while the small amount of phosphorus is detected. Further, hydrogen stabilizes unstable oxygen that is not bonded to the first metal. For example, —O— is changed to a state of —OH. Hydrogen is detected together with oxygen. Each element of phosphorus, carbon, hydrogen, and oxygen may form a compound or a group.

A content of each element of phosphorus, carbon, and hydrogen contained in the underlayer may be a small amount. Although phosphorus, carbon, and/or hydrogen may be unevenly distributed in the underlayer, at least one kind selected from the group consisting of phosphorus, carbon, and hydrogen may be contained in the first layer, for example.

An analysis method of each element is not particularly limited, but a distribution or concentration of each element can be measured by analysis of a cross section of the underlayer, the dielectric layer, or the first layer, for example, element mapping using energy-dispersive X-ray spectroscopy (EDX). Alternatively, the distribution or concentration of each element can be measured by analysis of the underlayer, the dielectric layer, or the first layer in a depth direction, for example, glow-discharge optical emission spectrometry (GD-OES), or the like.

For example, when the underlayer is analyzed from a surface of the underlayer at a side close to the first layer along the depth direction thereof by the glow discharge optical emission spectrometry (GD-OES) and a peak ascribed to any element is observed, it may be determined that the underlayer contains an element corresponding to the peak. When the underlayer is analyzed by the glow discharge optical emission spectrometry along the depth direction thereof, at least a peak ascribed to phosphorus is preferably observed. A peak ascribed to at least one kind selected from the group consisting of carbon, hydrogen, and oxygen may be observed.

When the coordination number of oxygen in the stoichiometric composition of the oxide of the second metal is $X1$ and the actual coordination number of the oxygen in the oxide of the second metal is $X2$, the ratio of $X2$ to $X1$ ($X2/X1$) may be greater than or equal to, for example, 0.9. When the preferable growth of the first layer is promoted, the coordination number $X2$ of oxygen in the oxide of the second metal approaches the coordination number $X1$ in the stoichiometric composition.

The underlayer may further contain nitrogen. In this case, a C—N bond may be detected in electron energy loss spectroscopy (TEM-EELS).

A second layer may be disposed between the metal framework and the first layer. In this case, the underlayer is included in the second layer. Further, the second layer contains an oxide of the first metal, and includes the underlayer at a side close to the first layer. The second layer can be formed, for example, by chemically converting the porous part of the anode body. In this case, a valve metal suitable for chemical conversion is preferably used as the first metal. A region other than the underlayer of the second layer may have a composition different from a composition of the underlayer. In the region other than the underlayer of the second layer, for example, concentrations of elements such as phosphorus and carbon may decrease as the region becomes further away from the underlayer. The region other than the underlayer of the second layer has a composition different from the underlayer, for example, in that the second layer may have a region in which phosphorus is not substantially contained.

The second layer may contain a composite oxide of the oxide of the first metal and the oxide of the second metal. The second layer is formed, and thus, even when there is the defect in the first layer, the defect can be repaired. Thus, the leakage current is further reduced.

Thickness T1 of the first layer and thickness T2 of the second layer may satisfy $T1 \geq 2 \times T2$ or $T1 \geq 3 \times T2$. By increasing the thickness of the first layer relative to the thickness of the second layer when the second metal having the high dielectric constant is selected, for example, the capacitance of the electrolytic capacitor can be remarkably improved.

The first metal may contain, for example, aluminum (Al). At this time, the second metal may contain, for example, at least one selected from the group consisting of tantalum (Ta), niobium (Nb), titanium (Ti), silicon (Si), zirconium (Zr), and hafnium (Hf).

The electrode foil for an electrolytic capacitor is produced, for example, by a method including, at minimum, (i) a step of preparing an anode body (or metal foil) having a porous part, (ii) a step of forming an underlayer on a surface of a metal framework, and (iii) a step of forming a dielectric layer covering at least a part of a surface of the underlayer. The electrolytic capacitor is produced by a method including (iv) a step of forming a cathode part covering at least a part of the dielectric layer in addition to steps (i) to (iii) described above.

Step (i)

Step (i) of preparing the metal foil (anode body) having the porous part may be, for example, a step of roughening the metal foil by etching the metal foil containing the first metal. A plurality of pits or pores is formed on the surface of the metal foil by roughening. The etching can be performed by, for example, direct current etching using direct current or alternating current etching using alternating current. For example, an aqueous solution containing hydrochloric acid and sulfuric acid is used as an etching solution for immersing the metal foil.

After the etching is completed, the anode body having the porous part may be washed with an acidic solution. For example, the anode body may be washed with an aqueous solution containing sulfuric acid, nitric acid, oxalic acid, or the like to remove a chlorine component. At this time, when the anode body is washed with a phosphoric acid aqueous solution, excessive phosphorus may adhere to the anode body, and the capacitance of the electrolytic capacitor may be reduced.

Although a kind of the first metal is not particularly limited, a valve metal such as aluminum (Al), tantalum (Ta), or niobium (Nb), or an alloy containing the valve metal can be used from the viewpoint of easily forming the second layer by chemical conversion. Copper (Cu) may be contained in the metal foil in order to effectively form the porous part. A thickness of the metal foil is not particularly limited, and ranges, for example, from 15 μm to 300 μm, inclusive.

A pore diameter of the pit or pore formed on the surface of the metal foil is not particularly limited, but may range, for example, from 50 nm from 2000 nm, inclusive, from the viewpoint of increasing a surface area and forming the dielectric layer up to a deep portion of the porous part. The pore diameter is a most frequent pore diameter of a pore distribution measured by, for example, a mercury porosimeter. A thickness of the porous part is not particularly limited, and may be appropriately set in accordance with the thickness of the metal foil, but may range, for example, from 1/10 to 4/10, inclusive, of the thickness of the anode body for each surface. A thickness D of the porous part may be obtained as an average value of any 10 points in an electron micrograph of a cross section of the anode body. Hereinafter, a thickness of the dielectric layer, that is, the thicknesses of the first layer and the second layer can be similarly calculated.

Step (ii)

Next, a step of bringing an alkali solution into contact with the anode body having the porous part and a step of forming the underlayer on the surface of the metal framework constituting the porous part by heating the anode body to which the alkali solution adheres are performed.

Since the alkaline solution having too strong in alkaline may damage the metal framework, it is preferable that the alkaline solution has mild alkalinity. It is preferable to use an organic alkali component rather than an inorganic alkali component, and for example, it is preferable to use an organic amine compound. pH of the alkaline solution is set to be, for example, in a range from 8 to 14 or from 8 to 13. A solvent of the alkaline solution preferably contains water as a main component, and 80 mass % or more of the solvent may be water.

The organic amine compound preferably exhibits water solubility and chelating ability. For example, alkanolamine may be used. The alkanolamine may have a plurality of hydroxyl groups in one molecule, and may have, for example, two or three hydroxyl groups. More specifically, for example, monoethanolamine, diethanolamine, triethanolamine, ethylenediamine, diethylenetriamine, aminoethylethanolamine, or the like can be used.

The method for bringing the alkaline solution into contact with the anode body is not particularly limited, but for example, the method can be performed by immersing the anode body in the alkaline solution, spraying the alkaline solution to the anode body, or the like. A contact time until the alkali solution and the anode body are heated may range, for example, from 10 seconds to 10 minutes, inclusive.

In the step of heating the anode body to which the alkali solution adheres, for example, the anode body to which the alkali solution adheres may be heated at a temperature ranging from 200° C. to 550° C., inclusive, preferably from 250° C. and 500° C., inclusive. At this time, a heating atmosphere may be an oxidizing atmosphere, but a non-oxidizing atmosphere is preferable from the viewpoint of forming the underlayer that is as thin as possible, homogeneous, and stable. The non-oxidizing atmosphere may be an atmosphere in which a mole fraction of an inert gas (rare gas such as Ar or He, nitrogen, or the like) exceeds 90%, a reduced-pressure atmosphere, or the like. By such a heating step, a stable underlayer is formed by hydrogenating unstable oxygen that is not bonded to the first metal and generating many surface hydroxyl groups.

Here, the underlayer may contain phosphorus, and may further contain carbon, oxygen, hydrogen, and the like. For example, phosphorus may be contained in the alkaline solution. Alternatively, an alkaline solution containing no phosphorus may be brought into contact with the anode body, and then the anode body may be brought into contact with a phosphorus-containing solution. It is preferable to add a small amount of phosphorus in the alkaline solution from the viewpoint of adding an appropriate amount of phosphorus in the underlayer.

The method for adding the phosphorus to the alkaline solution or the phosphorus-containing solution is not limited, and for example, a phosphorus compound may be added to the solution. Examples of the phosphorus compound include phosphoric acid, ammonium dihydrogen phosphate, phosphonic acid, and phosphinic acid. When the organic alkaline component is contained in the alkaline solution, phosphorus and carbon can be contained in the underlayer.

A phosphorus concentration in the alkaline solution or the phosphorus-containing solution is preferably a small amount from the viewpoint of improving the capacitance of the electrolytic capacitor, and may be, for example, greater than or equal to 0.01 ppm, or may be greater than or equal to 0.1 ppm at a mass concentration. The phosphorus concentration in the alkaline solution or the phosphorus-containing solution is, for example, preferably less than or equal to 500 ppm, and more preferably less than or equal to 100 ppm in terms of a mass concentration such that excess phosphorus does not adhere to the anode body.

Step (iii)

Step (iii) of forming the dielectric layer includes, for example, a step of forming the first layer on the surface of the underlayer by a gas phase method. The first layer contains the oxide of the second metal different from the first metal.

Examples of the second metal include aluminum (Al), tantalum (Ta), niobium (Nb), (Si), titanium (Ti), zirconium (Zr), and hafnium (Hf). These metal may be used singly or in combination of two or more kinds thereof. That is, the first layer may contain $Al_2O_3$, $Ta_2O_5$, $Nb_2O_5$, $SiO_2$, $TiO_2$, $ZrO_2$, $HfO_2$, or the like singly or two or more kinds thereof. When the first layer contains two or more kinds of oxides of the second metal, two or more kinds of oxides may be mixed, or each of the oxides may be disposed in a layer. From the viewpoint of increasing the capacitance of the electrolytic capacitor, the oxide of the second metal preferably has a higher relative dielectric constant than the oxide of the first metal. From the viewpoint of improving a withstand voltage of the electrolytic capacitor, the second metal is preferably tantalum (Ta), titanium (Ti), silicon (Si), or the like.

As the gas phase method, for example, a vacuum vapor deposition method, a chemical vapor deposition method, a mist vapor deposition method, a sputtering method, a pulsed laser deposition method, an atomic layer deposition (ALD method), or the like can be selected. Among these methods, the ALD method is excellent in that a dense dielectric layer can be formed up to the deep portion of the porous part. The thickness of the first layer is not particularly limited, and may be, for example, in a range from 0.5 nm to 200 nm, inclusive, or a range from 5 nm to 100 nm, inclusive.

FIG. 1 illustrates an example of anode foil 10 including anode body 110 that is an integrated product of core material part 111 and porous part 112, and dielectric layer 120 that covers a surface of a metal framework constituting porous part 112. (A) of FIG. 1 is an enlarged schematic cross-sectional view illustrating a part of porous part 112 having only first layer 121 as dielectric layer 120. (B) of FIG. 1 is an enlarged view of a portion surrounded by broken line X in (A) of FIG. 1. Underlayer 130 is provided at a boundary between first layer 121 and the metal framework.

As illustrated in (A) of FIG. 1, porous part 112 has a large number of pits (or pores) P surrounded by the metal framework. Dielectric layer 120 (first layer 121) is provided so as to cover at least a part of the surface of the metal framework. First layer 121 contains an oxide of a second metal different from the first metal contained in the metal framework, and a thickness is indicated by T1.

An ALD method is a film formation method for forming the dielectric layer (first layer) containing the oxide of the second metal on a surface of an object by alternately supplying a raw material gas containing the second metal and an oxidizing agent to a reaction chamber in which the object is disposed. In the ALD method, since a self-limiting action functions, the second metal is deposited on the surface of the object in units of atomic layers. Thus, the thickness of the first layer is controlled by a number of cycles in which supply of raw material gas→exhaust (purge) of raw material gas→supply of oxidizing agent→exhaust (purge) of oxidizing agent is taken as one cycle. That is, the ALD method can easily control the thickness of the dielectric layer to be formed.

The ALD method can be performed under a condition of a temperature range from 100° C. to 400° C., inclusive, as compared with CVD generally performed under a condition of a temperature range from 400° C. to 900° C., inclusive.

That is, the ALD method is excellent in that thermal damage to the metal foil can be suppressed.

Examples of the oxidizing agent used in the ALD method include water, oxygen, and ozone. The oxidizing agent may be supplied to the reaction chamber as plasma using the oxidizing agent as a raw material.

The second metal is supplied to the reaction chamber as a gas of a precursor containing the second metal. The precursor is, for example, an organometallic compound containing the second metal, and thus, the second metal is easily chemically adsorbed to the object. In the related art, various organometallic compounds used in the ALD method can be used as the precursor.

Examples of the precursor containing aluminum include trimethylaluminum $((CH_3)_3Al)$. Examples of the precursor containing Zr include bis(meth-$\eta^5$-cyclopentadienyl) methoxymethyl zirconium $(Zr(CH_3C_5H_4)_2CH_3OCH_3)$, tetrakis (dimethylamide) zirconium (IV) $([(CH_3)_2N]_4Zr)$, tetrakis(ethylmethylamide) zirconium (IV) $(Zr(NCH_3C_2H_5)_4)$, and zirconium (IV) t-butoxide $(Zr[OC(CH_3)_3]_4)$. Examples of the precursor containing Nb include niobium (V) ethoxide $(Nb(OCH_2CH_3)_5)$, and tris(diethylamide)(t-butylamide) niobium $(V)(C_{16}H_{39}N_4Nb)$.

Examples of the precursor containing tantalum include (t-butylamide) tris(ethylmethylamino) tantalum (V) $(C_{13}H_{33}N_4Ta$, TBTEMT) tantalum (V) pentaethoxide $(Ta(OC_2H_5)_5)$, (t-butylamide) tris(diethylamino, tantalum (V) $((CH_3)_3CNTa(N(C_2H_5)_2)_3)$, and pentakis(dimethylamino) tantalum (V) $(Ta(N(CH_3)_2)_5)$.

Examples of the precursor containing niobium include niobium (V) ethoxide $(Nb(OCH_2CH_3)_5)$, and tris(diethylamide) (t-butylamide) niobium (V) $(C_{16}H_{39}N_4Nb)$.

Examples of the precursor containing silicon include N-sec-butyl (trimethylsilyl) amine $(C_7H_{19}NSi)$, 1,3-diethyl-1,1,3,3-tetramethyldisilazane $(C_8H_{23}NSi_2)$, 2,4,6,8,10-pentamethylcyclopentasiloxane $((CH_3SiHO)_5)$, pentamethyldisilane $((CH_3)_3SiSi(CH_3)_2H)$, tris(isopropoxy) silanol $([(H_3C)_2CHO]_3SiOH)$, chloropentamethyldisilane $((CH_3)_3SiSi(CH_3)_2Cl)$, dichlorosilane $(SiH_2Cl_2)$, tridimethylaminosilane $(Si[N(CH_3)_2]_4)$, tetraethylsilane $(Si(C_2H_5)_4)$, tetramethylsilane $(Si(CH_3)_2)_6)$, tetraethoxysilane $(Si(OC_2H_5)_4)$, dodecamethylcyclohexasilane $((Si(CH_3)_2)_6)$, silicon tetrachloride $(SiCl_4)$, and silicon tetrabromide $(SiBr_4)$.

Examples of the precursor containing titanium include bis(t-butylcyclopentadienyl) titanium (IV) dichloride $(C_{18}H_{26}Cl_2Ti)$ tetrakis(dimethylamino) titanium (IV) $([(CH_3)_2N]_4Ti$, TDMAT), tetrakis(diethylamino) titanium (IV) $([C_2H_5)_2N]_4Ti)$ tetrakis (ethylmethylamino) titanium (IV) $(Ti[N(C_2H_5)(CH_3)]_4)$, titanium (IV) (diisopropoxide-bis (2,2,6,6-tetramethyl-3,5-heptanedioate $(Ti[OCC(CH_3)_3CHCOC(CH_3)_3]_2(OC_3H_7)_2)$, titanium tetrachloride $(TiCl_4)$, titanium (IV) isopropoxide $(Ti[OCH(CH_3)_2]4)$, and titanium (IV) ethoxide $(Ti[O(C_2H_5)]_4)$.

Examples of the precursor containing zirconium include bis(methyl-$\eta^5$cyclopentadienyl) methoxymethyl zirconium $(Zr(CH_3C_5H_4)_2CH_3OCH_3)$, tetrakis(dimethylamide) zirconium (IV) $([CH_3)_2N]_4Zr)$, tetrakis(ethylmethylamide) zirconium (IV) $(Zr(NCH_3C_2H_5)_4)$, and zirconium (IV) t-butoxide $(Zr[OC(CH_3)_3]_4)$.

Examples of the precursor containing hafnium include hafnium tetrachloride $(HfCl_4)$, tetrakis dimethylamino hafnium $Hf[N(CH_3)_2]_4)$, tetrakis ethylmethyl amino hafnium $(Hf[N(C_2H_5)(CH_3)]_4)$, tetrakis diethylamine hafnium $(Hf[N(C_2H_5)_2]_4)$, and hafnium t-butoxide $(Hf[OC(CH_3)_3]_4)$.

The method for producing the electrode foil for an electrolytic capacitor may further include a step of chemically converting (anodizing) the anode body having the first layer. Accordingly, the second layer containing the oxide of the first metal and including the underlayer at the first layer side can be formed between the metal framework and the first layer. Thickness T2 of the second layer can be controlled by the voltage applied to the anode body at the time of chemical conversion. A chemical conversion solution is not particularly limited, but for example, a diammonium adipate aqueous solution can be used.

Figure 2:
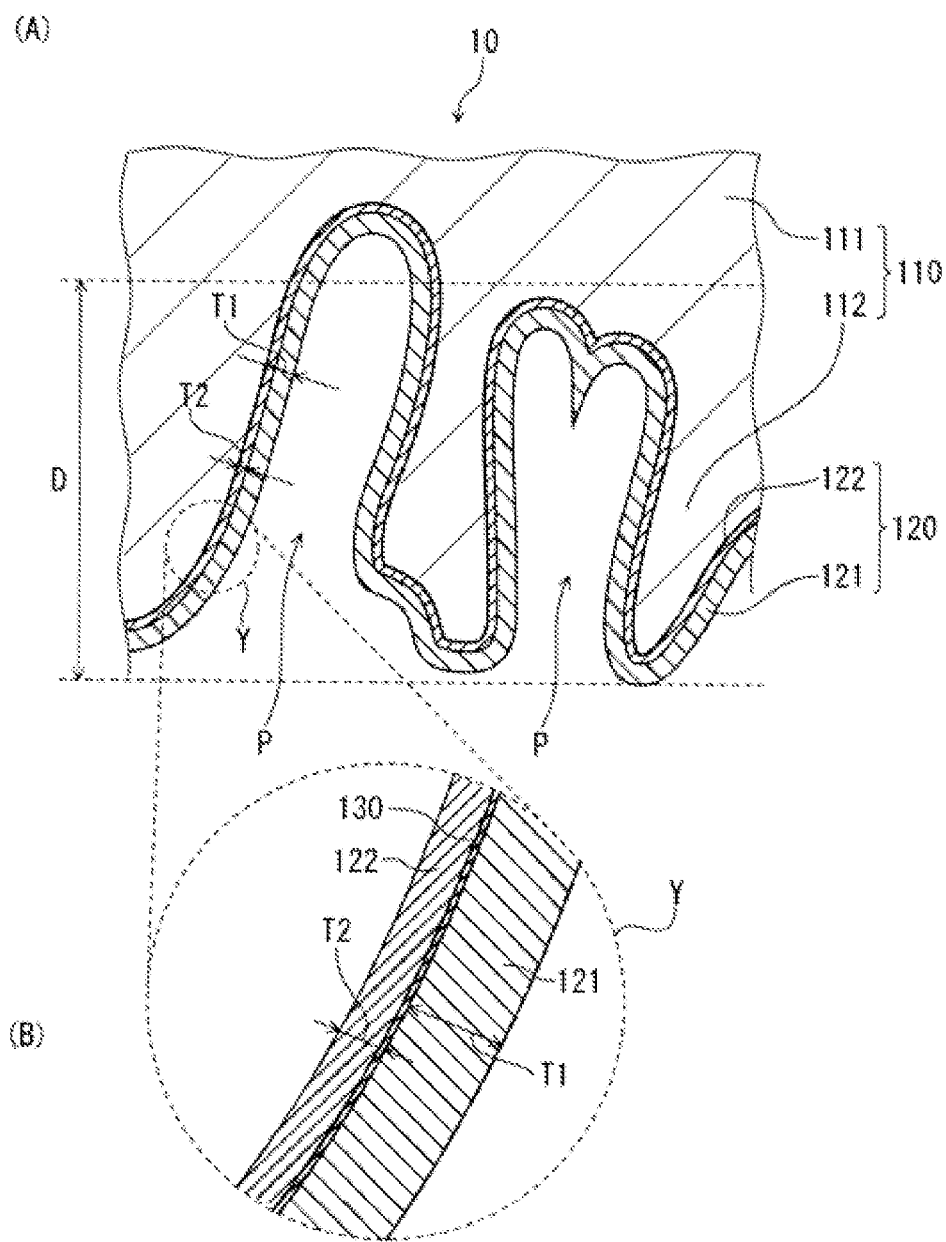
FIG. 2 is an enlarged schematic cross-sectional view illustrating an anode foil according to another exemplary embodiment of the present disclosure, (A) is an enlarged schematic cross-sectional view illustrating a part of a porous part including a dielectric layer, and (B) is an enlarged view of a portion surrounded by a broken line Y.

(A) of FIG. 2 is an enlarged schematic cross-sectional view illustrating a part of porous part 112 including, as dielectric layer 120, first layer 121 and second layer 122. (B) of FIG. 2 is an enlarged view of a portion surrounded by broken line Y in (A) of FIG. 2. In FIG. 2, constituent elements corresponding to those in FIG. 1 are denoted by the same reference signs as those in FIG. 1.

As illustrated in (A) of FIG. 2, dielectric layer 120 includes second layer 122 (including underlayer 130) and first layer 121 in this order from the metal framework. The thickness of first layer 121 is indicated by T1, and the thickness of the second layer is indicated by T2. As illustrated in (B) of FIG. 2, underlayer 130 is provided at the boundary between first layer 121 and second layer 122. For example, when the thickness of the second layer is very small, the second layer is not interposed between the underlayer and the metal framework, and there may be a portion at which the underlayer is continuous with the metal framework.

According to the ALD method, a thin and uniform dielectric layer (first layer) can be formed. However, actually, the surface of the deep portion of the pit included in the porous part may have a macroscopic defect such as a pinhole or a fine defect such as a lattice defect. When the second layer is formed, the ionized first metal diffuses to the first layer, and thus, an action of repairing the defect of the first layer is achieved. As a result, a dielectric layer having a uniform thickness with a reduced defect such as a pinhole is formed as a whole. Thus, the capacitance of the electrolytic capacitor is increased, the natural potential of the anode body is increased, and the withstand voltage is improved.

Thickness T2 of the second layer is not particularly limited, but may be smaller than thickness T1 of the first layer. Thickness T2 of the second layer ranges, for example, from 0.5 nm to 200 nm, inclusive, and may range, for example, from 5 nm to 100 nm, inclusive.

A ratio between thickness T1 of the first layer and thickness T2 of the second layer is not particularly limited, and may be appropriately set in accordance with an application, a desired effect, and the like. For example, the thickness ratio (T1/T2) may be 1 or more, 2 or more, or 5 or more.

Here, when the porous part is equally divided into three regions of a first region, a second region, and a third region in order from a metal core part in a thickness direction of the porous part, porosity P1 of the first region, porosity P2 of the second region, and porosity P3 of the third region may satisfy P1<P2<P3. That is, the porosity of the porous part may be increased toward the outer surface of the anode body.

On the other hand, in the deep portion (for example, the third region) of the porous part, the porosity is relatively low, and a pit diameter (or pore diameter) of an etching pit is relatively small. In other words, there are many fine pores in the deep portion of the porous part, and a large surface area is secured. Thus, even when the surface area in proximity to the outer surface of the anode body (for example, the first region) is relatively small, a sufficiently large electrostatic capacitance is easily secured.

The porosity of the porous part may be measured by the following method. First, the anode body is cut so as to obtain a cross section of the metal core part and the porous part of the anode body in the thickness direction, and an electron micrograph of the cross section is captured. Next, an image of the cross section is binarized to distinguish between the metal framework and voids. Subsequently, the image is divided into a plurality of parts (for example, 0.1 μm intervals) along a path parallel to the thickness direction of the anode body from the surface of the anode body toward the metal core part, and an average value of the porosities of the divided parts is calculated as the porosity. The calculated value is used, and thus, a graph representing a relationship between a distance from the surface of the anode body and the porosity can be drawn. In the first region, the second region, and the third region, a plurality of porosities at any positions may be extracted at equal intervals, an average of the plurality of porosities may be calculated, and the average value may be used as porosity P1, porosity P2, and porosity P3.

P2 and P3 may satisfy P2×1.1≤P3, or may satisfy P2×1.2≤P3. P1 and P2 may satisfy P1×1.05≤P2, or may satisfy P1×1.1≤P2.

P1 may be, for example, 30% or more. P2 may be, for example, 40% or more, and may be 50% or more. P3 may be 60% or more. In this case, when the dielectric layer is formed by the gas phase method such as the atomic layer deposition method, the diffusibility of the raw material gas of the dielectric layer to the deep portion of the metal porous part is further improved. Meanwhile, from the viewpoint of securing sufficient strength of the anode body, P3 is preferably 80% or less, P2 is preferably 70% or less, and P1 is preferably 60% or less.

Step (iv)

In step (iv) of forming the cathode part covering the dielectric layer, for example, the anode body having the dielectric layer may be impregnated with the electrolytic solution, and/or a solid electrolyte layer may be formed on the surface of the dielectric layer. When both the formation of the solid electrolyte layer and the impregnation of the electrolytic solution are performed, the solid electrolyte layer may be formed on the dielectric layer, and then the impregnation of the electrolytic solution may be performed.

The electrolytic solution may be a nonaqueous solvent, or may be a mixture of a nonaqueous solvent and an ionic substance (solute (for example, organic salt)) dissolved in the nonaqueous solvent. The nonaqueous solvent may be an organic solvent or an ionic liquid.

The nonaqueous solvent is preferably a high boiling point solvent. Examples of the nonaqueous solvent include polyhydric alcohols such as ethylene glycol and propylene glycol, cyclic sulfones such as sulfolane, lactones such as γ-butyrolactone, amides such as N-methylacetamide, N,N-dimethylformamide, and N-methyl-2 pyrrolidone, esters such as methyl acetate, carbonate compounds such as propylene carbonate, ethers such as 1,4-dioxane, ketones such as methyl ethyl ketone, and formaldehyde.

The organic salt is salt in which at least one of an anion and a cation contains an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2 ethylimidazolinium phthalate.

The solid electrolyte layer contains, for example, a manganese compound, a conductive polymer, and the like. Polypyrrole, polythiophene, polyaniline, derivatives thereof, and the like can be used as the conductive polymer. The solid electrolyte layer containing the conductive polymer can be formed by, for example, chemical polymerization and/or electrolytic polymerization of a raw material monomer on the dielectric layer. The solid electrolyte layer may be formed by attaching a solution in which the conductive polymer is dissolved or a dispersion liquid in which the conductive polymer is dispersed to the dielectric layer.

Figure 4:
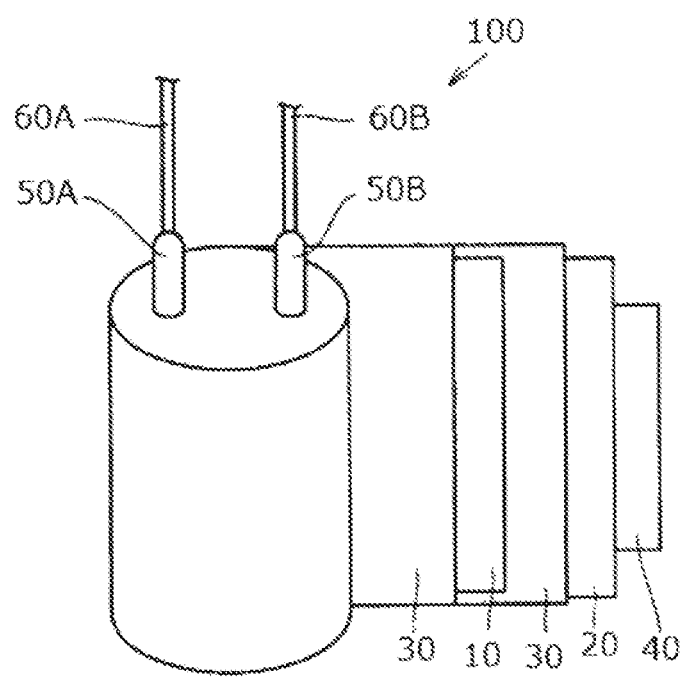
FIG. 4 is a perspective view schematically illustrating a configuration of a wound body included in the electrolytic capacitor.

When the anode body having the dielectric layer is the anode foil illustrated in FIGS. 1 and 2, wound body 100 illustrated in FIG. 4 may be prepared before the cathode part is formed. FIG. 4 is a developed view for describing a configuration of wound body 100.

When wound body 100 is prepared, cathode foil 20 is prepared in addition to anode foil 10. A metal foil can be used for cathode foil 20 in the same manner as anode foil 10. A kind of the metal forming cathode foil 20 is not particularly limited, but a valve metal such as aluminum (Al), tantalum (Ta), or niobium (Nb), or an alloy containing the valve metal can be used. A surface of cathode foil 20 may be roughened as necessary.

Subsequently, anode foil 10 and cathode foil 20 are wound with separator 30 interposed therebetween. One ends of lead tabs 50A and 50B are respectively connected to anode foil 10 and cathode foil 20, and wound body 100 is formed while lead tabs 50A and 50B are wound. Lead wires 60A and GOB are connected to the other ends of lead tabs 50A and 50B, respectively.

Separator 30 is not particularly limited, and for example, nonwoven fabric containing cellulose, polyethylene terephthalate, vinylon, aramid fiber, or the like as a main component can be used.

Subsequently, winding stop tape 40 is disposed on an outer surface of cathode foil 20 positioned at an outermost layer of wound body 100, and an end of cathode foil 20 is fixed with winding stop tape 40. When anode foil 10 is prepared by cutting a large foil, a chemical conversion treatment may further be performed on wound body 100 in order to provide the dielectric layer on the cut surface.

A method for impregnating wound body 100 with the electrolytic solution, the solution in which the conductive polymer is dissolved, and/or the dispersion in which the conductive polymer is dispersed is not particularly limited. For example, a method for immersing wound body 100 in the electrolytic solution, the solution, or the dispersion stored in a container, a method for dropping the electrolytic solution, the solution, or the dispersion on wound body 100, or the like can be used. The wound body may be impregnated under a reduced pressure in an atmosphere of a range, for example, from 10 kPa to 100 kPa, inclusive, preferably a range from 40 kPa to 100 kPa, inclusive.

Figure 3:
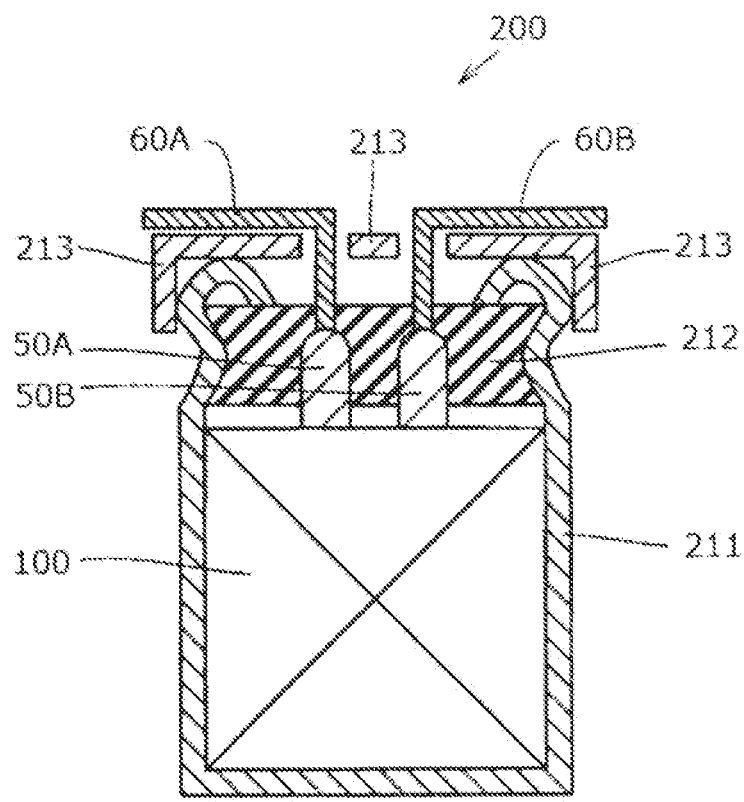
FIG. 3 is a schematic cross-sectional view illustrating an electrolytic capacitor.

Subsequently, electrolytic capacitor 200 illustrated in FIG. 3 is obtained by sealing wound body 100. In order to produce electrolytic capacitor 200, first, wound body 100 is housed in bottomed case 211 such that, lead wires 60A and 60B are positioned on an opening side of bottomed case 211. Metal such as aluminum, stainless steel, copper, iron, or brass, or an alloy thereof can be used as a material of bottomed case 211.

Subsequently, sealing member 212 formed such that lead wires 60A and 60B penetrate is disposed above wound body 100, and wound body 100 is sealed in bottomed case 211. Sealing member 212 may be an insulating substance, and is preferably an elastic body. Among these materials, silicone rubber, fluororubber, ethylene propylene rubber, Hypalon rubber, butyl rubber, isoprene rubber, and the like having high heat resistance are preferable.

Subsequently, lateral drawing is performed on bottomed case 211 in proximity to an opening end, and curling is performed by swaging the opening end in sealing member 212. Finally, sealing is completed by disposing base plate 213 on the curled portion. Thereafter, an aging treatment may be performed while a rated voltage is applied.

In the above exemplary embodiment, although the wound electrolytic capacitor has been described, an application range of the present disclosure is not limited to the above wound electrolytic capacitor, and the present disclosure can also be applied to other electrolytic capacitors, for example, stacked electrolytic capacitors.

Hereinafter, the present disclosure will be described in lore detail based on examples, but the present disclosure is not limited to the examples.

Example 1

In the present example, an electrode foil for an aluminum electrolytic capacitor having a chemical conversion voltage of 5 V was prepared. Hereinafter, a specific method for producing the electrode foil for an electrolytic capacitor will be described.

(Preparation of Anode Foil)

An aluminum foil having a thickness of 120 μm was prepared. A porous part was formed by performing an alternating current etching treatment on the aluminum foil in an aqueous solution obtained by adding sulfuric acid to hydrochloric acid and roughening the surface of the aluminum foil. A porous part having a thickness of 40 μm was formed on both surfaces of the aluminum foil, and a pore diameter of the pit was in a range from 100 nm to 200 nm, inclusive. Thereafter, the aluminum foil having the porous part was washed with an oxalic acid aqueous solution (oxalic acid concentration: 0.01 mol/L).

The aluminum foil having the porous part was immersed in an alkaline aqueous solution containing monoethanolamine (monoethanolamine concentration: 0.1 mol/L) for 5 minutes. Subsequently, the aluminum foil having the porous part was further immersed in an aqueous solution containing a small amount of phosphorus (phosphoric acid concentration: 50 ppm) for 5 minutes. Thereafter, a thin underlayer was formed by heating the aluminum foil at 300° C. in an inert atmosphere (argon atmosphere).

Next, an oxide containing tantalum as a dielectric layer (first layer) was formed on a surface of an aluminum framework constituting the porous part by the ALD method (temperature: 200° C., precursor: (t-butylamide) tris(ethylmethylamino) tantalum (V) ($C_{13}H_{33}N_4Ta$, TBTEMT), oxidizing agent: $H_2O$, pressure: 10 Pa, 250 cycles).

Subsequently, an anode foil was obtained by performing a chemical conversion treatment on the aluminum foil and forming a second layer containing an oxide of aluminum between the aluminum framework and the first layer. The chemical conversion treatment was performed by immersing the aluminum foil having the first layer in a diammonium adipate aqueous solution (diammonium adipate concentration: 10 mass %) and applying a voltage of 5 V to the aluminum foil. An application time after the voltage reaches the chemical conversion voltage of about 5 V was set to 30 minutes. Thereafter, the anode foil was cut into a predetermined shape.

As a result of elemental analysis by GD-OES, phosphorus, carbon, hydrogen, and oxygen were contained in the underlayer, $Ta_2O_5$ was contained in the first layer (thickness: about 8 nm), the coordination number of oxygen in tantalum was 8, and $Al_2O_3$ was contained in the second layer (thickness: about 2 nm) (T1=4×T2). Meanwhile, the underlayer was a mixed layer of tantalum oxide and aluminum oxide.

The underlayer contained nitrogen (N) derived from monoethanolamine, and the presence of a C—N bond was confirmed by electron energy loss spectroscopy (TEM-EELS).

Figure 5:
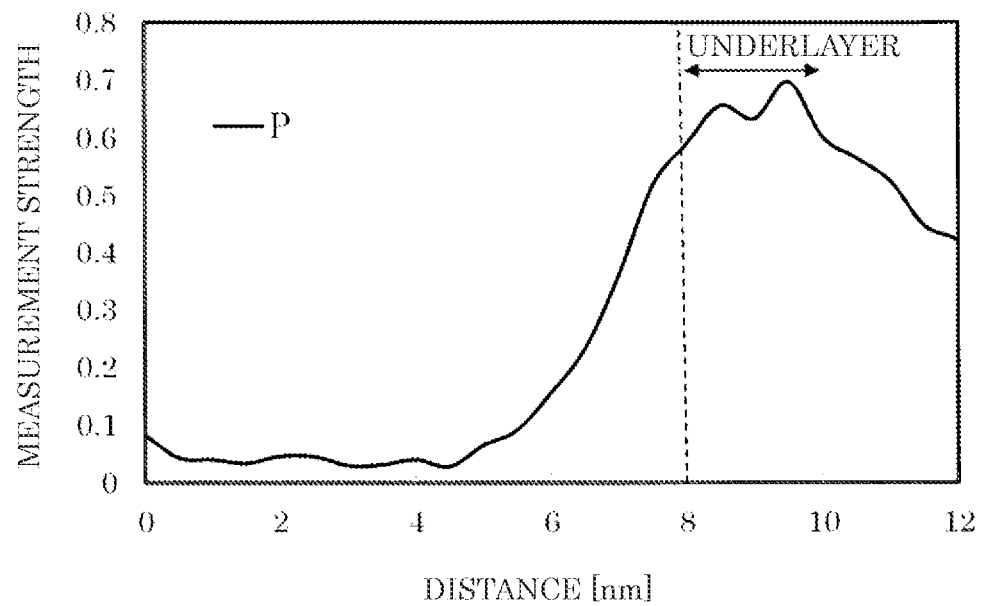
FIG. 5 is a graph showing a relationship between a distance from a surface of the dielectric layer and a measurement strength of phosphorus (a P content) according to an example of the present disclosure.

FIG. 5 shows a relationship between a content of phosphorus (P) and a distance (depth) in the depth direction from the surface of the first layer toward the second layer including the underlayer. In FIG. 5, a clear phosphorus peak is observed, and it can be confirmed that the phosphorus peak is present in the underlayer (distance range from 8 nm to 10 nm).

Figure 6:
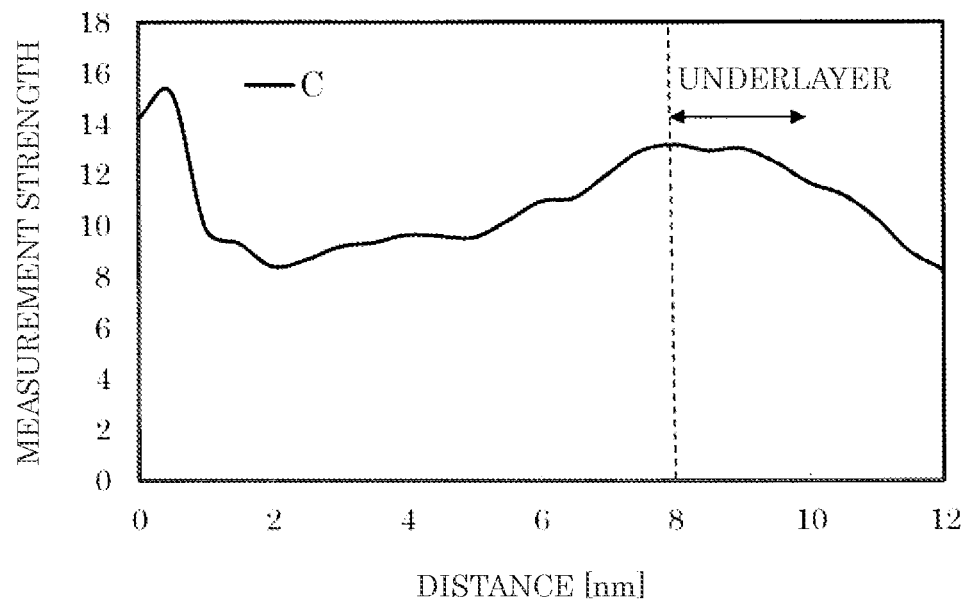
FIG. 6 is a graph showing a relationship between a distance from a surface of the dielectric layer and a measurement strength of carbon (a C content) according to the example of the present disclosure.

FIG. 6 shows a relationship between a content of carbon (C) and a distance (depth) from in the depth direction from the surface of the first layer toward the second layer including the underlayer. In FIG. 6, a carbon peak is observed, and it can be confirmed that the carbon peak is present in the underlayer (distance range from 8 nm to 10 nm).

[Evaluation]

An electrostatic capacitance and a leakage current of the obtained anode foil were measured. The leakage current was measured as a value accumulating the leakage current flowing until the voltage reached 4.6 V by immersing the anode foil in an ammonium adipate aqueous solution having a concentration of 10 mass % and applying a voltage while the voltage is increased at a rate of 0.2 V/sec.

As the acid resistance (deterioration test), after the electrode foil was immersed (deteriorated) in an acidic aqueous solution at 35° C. for 60 minutes, the leakage current was measured by the same measurement method as described above, and the acid resistance was evaluated. The evaluation results are shown in Table 1. Table 1 shows each relative value when a result of Comparative Example 1 is 100.

Comparative Example 1

An electrolytic capacitor was produced in the same manner as in Example 1 except that all the step of immersing the aluminum foil having the porous part in the alkaline aqueous solution and the step of subsequently heating the aluminum foil in the inert atmosphere were not performed. In the elemental analysis of the underlayer by GD-OES, substantial peaks of phosphorus, carbon, and hydrogen were not observed.

Comparative Example 2

An electrolytic capacitor was produced in the same manner as in Example 1 except that the aluminum foil having the porous part was washed with an ammonium dihydrogen phosphate aqueous solution (ammonium dihydrogen phosphate concentration: 1.4 g/L) instead of being washed with a sulfuric acid aqueous solution, and the step of immersing the aluminum foil having the porous part in the alkaline aqueous solution was not performed. In the elemental analysis of the underlayer by GD-OES, the phosphorus peak was observed, but a substantial carbon peak was not observed.

TABLE 1

|    | Electrostatic capacitance | Leak current | Acid resistance |
|----|---------------------------|--------------|-----------------|
| A1 | 110                       | 60           | 50              |
| B1 | 100                       | 100          | 100             |
| B2 | 95                        | 98           | 95              |

In Example 1, the electrostatic capacitance was improved, the leakage current was reduced, and the acid resistance was improved as compared with Comparative Examples 1 and 2.

According to the present disclosure, it is possible to obtain an electrode foil for an electrolytic capacitor, an electrolytic capacitor, and a production method therefor which can sufficiently reduce a leakage current.

What is claimed is:

1. An electrode foil for an electrolytic capacitor, the electrode foil comprising:
   an anode body having a porous part; and
   a dielectric layer covering a surface of a metal framework constituting the porous part, wherein:
   the dielectric layer includes a first layer containing an oxide of a second metal, the second metal being different from a first metal contained in the metal framework,
   an underlayer that is continuous with the first layer is provided between the metal framework and the first layer, and
   the underlayer contains phosphorus and carbon.

2. The electrode foil according to claim 1, wherein, when the underlayer is analyzed in a depth direction from a surface of the underlayer at a side close to the first layer toward an inside of the underlayer by glow discharge optical emission spectrometry (GD-OES), a peak in a strength profile of GD-OES for phosphorus and a peak in a strength profile of GD-OES for carbon are observed.

3. The electrode foil according to claim 1, wherein:
   the dielectric layer further includes a second layer, the second layer being located between the metal framework and the first layer,
   the second layer contains an oxide of the first metal, and
   the underlayer is included in the second layer and is located at a side close to the first layer.

4. The electrode foil according to claim 1, wherein a ratio of X2 to X1 (X2/X1) is greater than or equal to 0.9, where X1 represents a coordination number of oxygen in a stoichiometric composition of the oxide of the second metal, and X2 represents an actual coordination number of the oxygen in the oxide of the second metal.

5. The electrode foil according to claim 1, wherein:
   the underlayer further contains nitrogen, and
   a C—N bond is detected in an analysis by electron energy loss spectroscopy (TEM-EELS).

6. The electrode foil according to claim 1, wherein:
   the first metal includes aluminum, and
   the second metal includes at least one kind selected from the group consisting of tantalum, niobium, titanium, silicon, zirconium, and hafnium.

7. An electrolytic capacitor comprising:
   the electrode foil according to claim 1; and
   a cathode part covering at least a part of the dielectric layer.

* * * * *